(No Model.)

W. J. & H. C. BROWNING.
ALARM ATTACHMENT FOR STEAM GAGES.

No. 579,219. Patented Mar. 23, 1897.

WITNESSES:
John Buckler,
C. Gerst

INVENTORS
William J. Browning and
Harry C. Browning
BY
Edgar Tate & Co
ATTORNEYS.

UNITED STATES PATENT OFFICE.

WILLIAM J. BROWNING AND HARRY C. BROWNING, OF NEW YORK, N. Y.

ALARM ATTACHMENT FOR STEAM-GAGES.

SPECIFICATION forming part of Letters Patent No. 579,219, dated March 23, 1897.

Application filed February 28, 1896. Renewed February 16, 1897. Serial No. 623,717. (No model.)

*To all whom it may concern:*

Be it known that we, WILLIAM J. BROWNING and HARRY C. BROWNING, citizens of the United States, and residents of New York, in the county of New York and State of New York, have invented certain new and useful Improvements in Alarm Attachments for Steam-Gages, of which the following is a specification, reference being had to the accompanying drawings, forming a part thereof, in which similar letters of reference indicate corresponding parts.

This invention relates to alarm attachments for steam-gages; and the object thereof is to provide a simple and effective alarm attachment which may be connected with a steam-gage of ordinary construction, such as is usually employed in connection with steam-boilers; and with this and other objects in view the invention consists in the construction, combination, and arrangement of parts hereinafter described and claimed.

The invention is fully disclosed in the following specification, of which the accompanying drawings form a part, in which—

Figure 1:
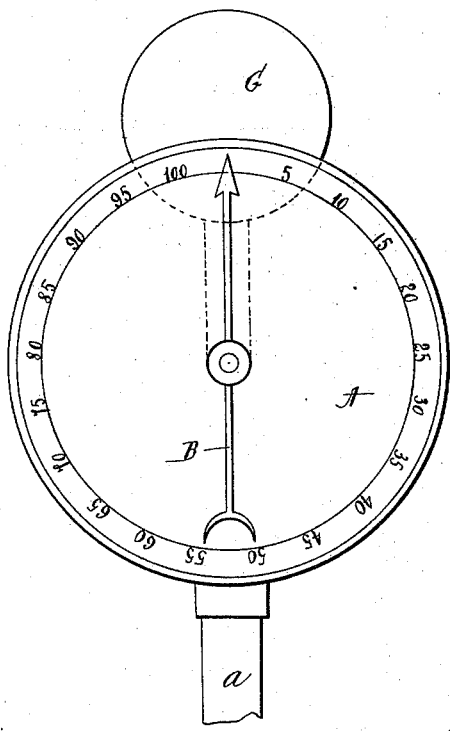
Figure 2:
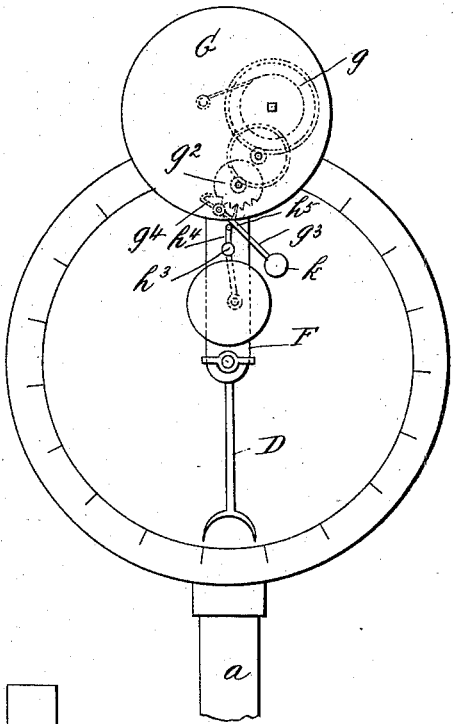

Figure 1 is a face view of a steam-gage provided with our improvement; Fig. 2, a back view thereof, and Fig. 3 a side view.

In the drawings forming part of this specification, A represents an ordinary steam-gage which may be connected with a boiler by means of a pipe $a$ in the usual manner, and the face of the gage A is provided with the usual scale and the usual pointer or indicator B, and the back thereof, as shown in Fig. 2, is provided with a similar scale and with a similar pointer or indicator D.

Figure 3:
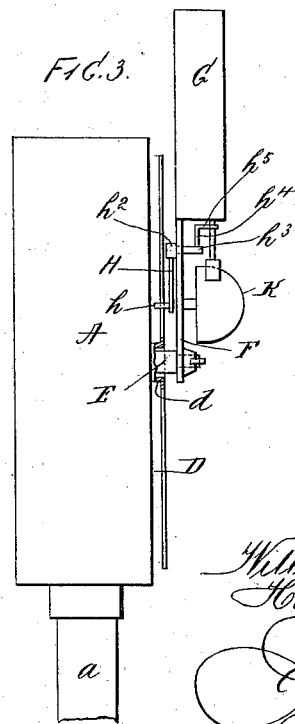

The pointers or indicators B and D are both mounted on the same shaft, which extends through the casing of the steam-gage, and said shaft is tubular in form, one end thereof being shown at $d$ in Fig. 3, and extending thereinto or therethrough and revoluble therein by hand or otherwise is a shaft E, and secured to said shaft is an upwardly-directed plate or arm F, which carries at its upper end a cylindrical casing G.

Within the casing G is a spring-drum $g$, which is shown in dotted lines in Fig. 2, and connected with said spring-drum is a train of gear-wheels which connect with or operate a sprocket or gear wheel $g^2$, as shown in dotted lines in said figure, and pivotally supported adjacent to the gear or sprocket wheel $g^2$ is a lever $g^3$, which carries an escapement $g^4$, which is adapted to operate in connection with the gear or sprocket wheel $g^2$. We also employ a crank-lever H, which is provided at its lower end with a projection $h$ and at its upper end with a head $h^2$ and one arm of which extends through the plate or arm F, as shown at $h^3$, and is provided with a rod $h^4$, having a projection $h^5$, which operates in connection with the lever $g^3$. The arm or plate F also carries a gong K, and the lever $g^3$ is provided with a ball or head $k$, and the projection $h$ at the lower end of the crank-lever H is adapted to be operated by the pointer or indicator D at the back of the steam-gage.

The operation will be readily understood from the foregoing description when taken in connection with the accompanying drawings and the following statement thereof. In practice the arm or plate F is turned to the point on the scale which indicates the pressure it is desired to carry. For instance, if it is desired to carry a pressure of ninety pounds the plate or arm F is turned so that it will cover the ninety-pound mark or point on the scale, and when the pointer or indicator D passes this point the projection $h$ on the lever H will be operated thereby, so as to break the connection of the extension $h^5$ of the rod $h^4$ with the lever $g^3$, and the latter will at once be operated by the spring $g$ and its train of gear-wheels to sound the alarm. It will be understood, of course, that the arm or plate F may be turned to any desired point on the scale at the back of the steam-gage and that the operation will be the same as above described, the pointer or indicator D always serving to operate the alarm when the pressure passes the desired point.

This device is simple in construction and operation and comparatively inexpensive and also perfectly adapted to accomplish the result for which it is intended and being also applicable to almost any form of steam-gages now in use, and it is evident that changes in and modifications of the construction herein described may be made without departing from the spirit of our invention or sacrificing its advantages, and we reserve the right to make all such alterations therein and modifications thereof as fairly come within the scope of the invention.

Having fully described our invention, we claim as new and desire to secure by Letters Patent—

The combination with a steam-gage, provided with a scale on its front and back, and with pointers or indicators which operate jointly, of an alarm which is connected with a shaft revolubly mounted in said gage, said alarm consisting of a casing provided with a spring-drum and gear-wheels in operative connection therewith, and a lever which is adapted to operate an alarm-gong, the support of the alarm-casing being also provided with a crank-lever, which is adapted to hold the lever by which the gong is sounded out of connection therewith, said crank-lever being adapted to be operated by one of the pointers or indicators, substantially as shown and described.

In testimony that we claim the foregoing as our invention we have signed our names, in presence of the subscribing witnesses, this 26th day of February, 1896.

WILLIAM J. BROWNING.
HARRY C. BROWNING.

Witnesses:
C. GERST,
F. V. KIRCHHOFF.